March 14, 1933.    G. R. BOTT    1,901,580
ANTIFRICTION BEARING
Filed Sept. 16, 1930
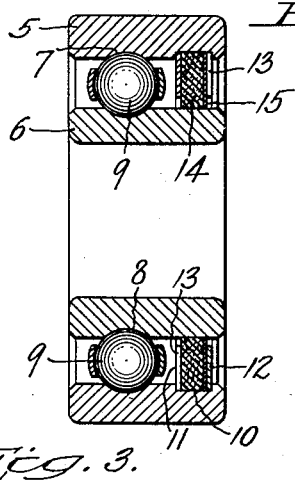
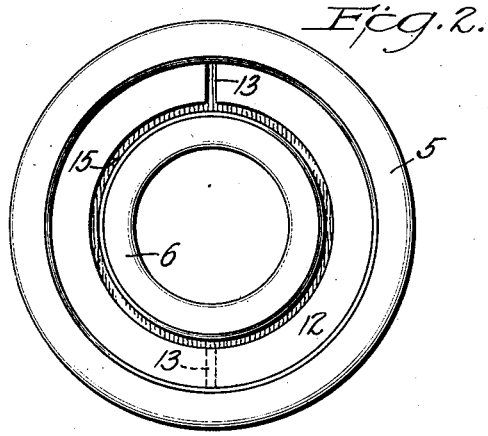
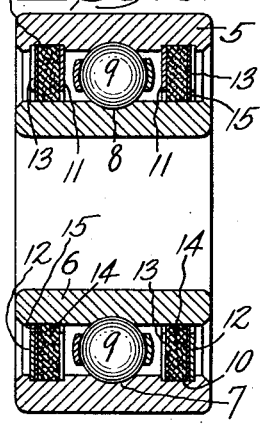
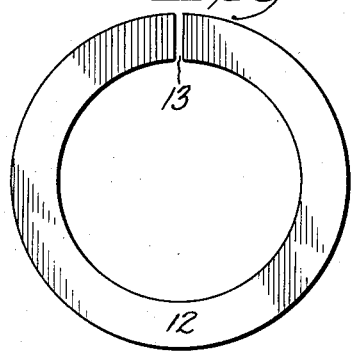
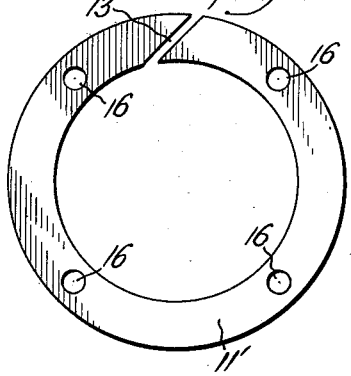
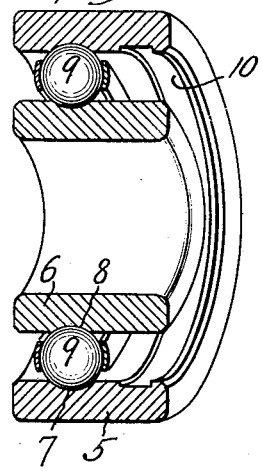
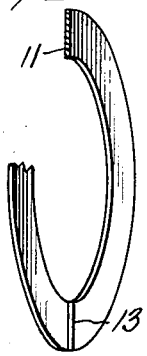
Inventor
GEORGE R. BOTT
By his Attorney Patented Mar. 14, 1933

1,901,580

UNITED STATES PATENT OFFICE

GEORGE R. BOTT, OF STAMFORD, CONNECTICUT, ASSIGNOR TO NORMA-HOFFMANN BEARINGS CORPORATION, OF STAMFORD, CONNECTICUT, A CORPORATION OF NEW YORK

ANTIFRICTION BEARING

Application filed September 16, 1930. Serial No. 482,226.

This invention relates to sealed anti-friction bearings.

The use of sealing devices for closing the open or exposed side of radial anti-friction bearings for the purpose of excluding dust and for retaining lubricant within the bearing, is a more or less recent development in the art. Several devices for this purpose have been heretofore suggested, and certain of these devices are in commercial use.

It is the primary object and purpose of my present invention to provide such a seal for radial anti-friction bearings which will not only be highly effective and reliable in practical use of the bearing, but which is likewise capable of easy and quick application in properly assembled relation to the bearing rings and with absolute assurance in the permanency of its predetermined assembled relation to the bearing rings and the anti-friction bearing members.

It is also another important object of the invention to provide a sealing means for the bearing which consists of parts of very simple mechanical form capable of production at very small cost, and which when properly assembled and applied to the bearing ring will provide a positive oil and dust-tight seal effectually preventing the ingress of dust or egress of oil from the bearing.

With the above and other objects in view, the invention consists in the improved sealed anti-friction bearing and in the form, construction and relative arrangement of its several parts as will be hereinafter more fully described, illustrated in the accompanying drawing and subsequently incorporated in the subjoined claims.

In the drawing wherein I have disclosed very simple and practical embodiments of the invention, and in which similar reference characters designate corresponding parts throughout the several views, Fig. 1 is a diametrical section through a radial anti-friction bearing having my improved seal applied to one side thereof.

Fig. 2 is a side elevation view.

Fig. 3 is a sectional view similar to Figure 1 showing the improved sealing means applied to both sides of the bearing.

Fig. 4 is a detail elevation of one of the split rings.

Fig. 5 is a sectional prospective view of the bearing before the sealing means is applied thereto.

Figs. 6, 7, 8 and 9 are fragmentary prospective views of the respective parts of the sealing means; and Fig. 10 is a detail elevation showing an alternative form of one of the split rings.

Referring more particularly to Fig. 1 of the drawing, 5 and 6 respectively indicate the outer and inner bearing rings. These rings are provided in their opposed circumferential faces and substantially at one side center line of the bearng with the races shown at 7 and 8 respectively to receive the bearing balls, rollers or other anti-friction elements 9. Thus it will be understood that the major portions of the bearing rings 5 and 6 project laterally from one side of the load center line of the bearing elements 9. In this part of the bearing ring 5 and in the inner face thereof adjacent to its side edge, a shallow rectangular annular groove 10 is turned. For the purpose of my invention, it is not necessary to finish the surfaces of this groove so that this operation may be very quickly completed.

My improved sealing means for the bearing includes inner and outer thin flat metal rings 11 and 12 respectively, each of which is split as indicated at 13. These rings may be of sheet brass, steel or other resilient metal, capable of diametrical contraction and expansion.

The sealing means further includes a relatively thick annular gasket 14 of felt or other compressed fibrous liquid absorbent material, and a thin annular sheet or ring 15 of fish paper, fibre or other tough impervious material of high tensile strength.

Each of the split rings 11 and 12 has an external diameter slightly exceeding the diameter of the groove 10. One way of applying the seal, is to first contract the ring 11 by forcing the ends thereof at the split 13 past each other in overlapping relation, the inner diameter of said ring being sufficiently greater than the outer diameter of the bearing ring 6 to permit said ring when thus contracted to be moved inwardly over the inner bearing ring, and in line with the inner side of groove 10. The ring is then released, whereby it immediately expands so that the outer edge of said ring exerts a tight frictional grip against the base wall of the groove 10. The ring is adjusted so that its inner side face abuts tightly against the inner edge or shoulder of the groove 10. Another way is to separate the split ring in the form of a spiral and feed one end of the ring into the groove first. Then diametrically contract the first half of the spiral to the proper contracted diameter and allow the ring to then expand itself as it flattens out. The felt gasket ring 14 is now inserted over the inner bearing ring 6, the external and internal diameters of said gasket being such that it will thereby be placed under slight radial compression, the inner edge of the gasket closely fitting upon the outer surface of the ring 6. When said gasket is positioned in line with groove 10 and against the outer side face of the split ring 12, the gasket will radially expand into tight frictional contact at its outer edge against the base wall of the groove 10.

The ring of fish paper ring or fibre 15 is now placed in position against the outer face of the gasket 14, said ring being of such width that its outer edge fits within the groove 10, while its inner edge is in close proximity to the periphery of the inner bearing ring 6.

Finally the other split ring 12 is contracted and fitted within the groove of the outer bearing ring against the fibre or paper ring 15. In positioning this outer split ring, the same is arranged with the split 13 thereof disposed out of alignment with the split of the inner ring 11 axially of the bearing. The felt gasket 14 is of such thickness that in placing the outside ring 12 in position, the felt is slightly compressed axially of the bearing. Upon release of the contracted outer ring 12, it expands into the groove 10 so that the outer edge of said ring has tight frictional engagement with the base wall of the groove. The expansion of the felt gasket 11 tends to force the split rings laterally in opposite directions and thus hold the same at their outer edges tightly against the spaced edges or shoulders of groove 10. The rings 11 and 12 at their inner edges are in clearance relation to the periphery of the inner bearing ring 6.

While the inner edge of the felt gasket closely hugs the periphery of the bearing ring 6, it will not have any retarding effect upon the rotation of said bearing ring, and as the gasket wears, it will radially expand and thus maintain a desired close contact upon the periphery of the ring. While this felt gasket will absorb the oil or grease with which the bearing is filled, the fibre or paper sheet 15, effectually precludes the passage of the oil from the gasket externally of the bearing. In this manner it will be evident that an absolute lubricant and dust tight seal will be automatically maintained.

If desired, I may provide one of the rings 11 with an oblique instead of a radial split as shown at 13' in Fig. 10 of the drawing, which illustrates an inner ring 11' having a plurality of spaced openings 16 therethrough to facilitate the passage of lubricant into contact with the felt gasket to be absorbed thereby. Thus the gasket will be kept thoroughly impregnated with the lubricant.

It will be evident from the foregoing that by means of my present invention, the application of such a seal to the bearing becomes a relatively simple matter, no special tools of any kind being required. While the rectangular groove 10 in the face of the bearing ring is very shallow so that only a relatively small contraction of the rings 11 and 12 is necessary in order that they may be properly fitted therein, these expansible rings together with the expanding pressure of the interposed felt gasket cooperating therewith, assures a retention of the several parts in relation to the walls of the groove in assembled position and obviates possibility of their displacement in the practical use of the bearing.

In Fig. 3 of the drawing I have shown the application of the above described sealing means to both sides of the bearing, and in this case, the anti-friction bearing elements 9 are centrally located in suitable races formed midway between the opposite sides of the bearing in opposed surfaces of the bearing rings. This double seal is necessary in cases where both sides of the bearing would otherwise be exposed, and of course after one seal has been applied, the bearing must be packed with lubricant before the other sealing means is applied.

From the above description considered in connection with the accompanying drawing, the construction, manner of use and several advantages of my present invention will be clearly understood. It will be appreciated I have devised a sealing means for anti-friction bearings which is of very simple structural form, may be manufactured at low cost, and is capable of easy and quick assembly and application in proper relation to the parts of the bearing. I have above referred to a preferred structural form of the several essential parts of my present improvements. It will, however, be understood that the same may also be produced in other alternative mechanical forms and I therefore reserve the privilege of resorting to all such legitimate changes therein as may be fairly considered within the spirit and scope of my invention as claimed.

I claim:

1. In an anti-friction bearing, inner and outer bearing rings, and anti-friction bearing elements between said rings; one of said rings in axially spaced relation to one end thereof being provided in one of its circumferential faces with a shallow annular groove having radially disposed shoulders at its opposite edges, and means for sealing the space between the bearing rings at one side of said elements, said means including an annular gasket of compressible absorbent material engaged at one of its edges upon the opposed circumferential face of the other bearing ring and having its other edge disposed within said groove, and a relatively narrow split expansible and contractible metallic ring at each side of said gasket extending at one of its edges into said groove adapted to contact with the respective shoulders, said rings holding the gasket under compression and being thereby urged in relatively opposite directions into frictional binding engagement with the respective shoulders, and the other edges of said rings being radially spaced from the corresponding edge of the gasket and in clearance relation to the other bearing ring.

2. In an anti-friction bearing, inner and outer bearing rings, and anti-friction bearing elements between said rings; one of said rings in axially spaced relation to one end thereof being provided in one of its circumferential faces with a shallow annular groove having radially disposed shoulders at its opposite edges, and means for sealing the space between the bearing rings at one side of said elements, said means including an annular gasket of compressible absorbent material engaged at one of its edges upon the opposed circumferential face of the other bearing ring and having its other edge disposed within said groove, a continuous annular sheet of impervious material completely covering the outer side face of said gasket, and a relatively narrow split expansible and contractible metallic ring at each side of said gasket extending at one of its edges into said groove, said rings holding the gasket under compression and being thereby urged in relatively opposite directions into frictional binding engagement with the respective shoulders, and the other edges of said rings being radially spaced from the corresponding edge of the gasket and in clearance relation to the other bearing ring.

3. In an anti-friction bearing, inner and outer rings and anti-friction bearing elements between said rings; means for sealing the space between the bearing rings at one side of said elements, including axially spaced parallel annular shoulders on one of said rings, a lubricant retaining gasket of compressible absorbent material, and a split expansible and contractible metallic ring at each side of said gasket, said gasket and the rings having their corresponding edges positioned between said shoulders and said rings holding the gasket under compression, whereby said metallic rings are axially urged by the expansion of said gasket in relatively opposite directions into frictional binding engagement with the respective parallel shoulders.

In testimony that I claim the foregoing as my invention, I have signed my name hereto.

GEORGE R. BOTT.